United States Patent [19]

Christoff

[11] Patent Number: 4,514,976
[45] Date of Patent: May 7, 1985

[54] INTEGRATED AUXILIARY POWER AND ENVIRONMENTAL CONTROL UNIT

[75] Inventor: William J. Christoff, Thousand Oaks, Calif.

[73] Assignee: Rockwell International Corporation, El Segundo, Calif.

[21] Appl. No.: 422,118

[22] Filed: Sep. 23, 1982

Related U.S. Application Data

[63] Continuation-in-part of Ser. No. 155,369, Jun. 2, 1980, abandoned.

[51] Int. Cl.³ .............................................. F02C 6/08
[52] U.S. Cl. .................................. 60/39.07; 60/39.15; 60/39.183
[58] Field of Search ............... 60/39.07, 39.142, 39.15, 60/39.183, 39.33; 98/1.5

[56] References Cited

U.S. PATENT DOCUMENTS

| | | | |
|---|---|---|---|
| 2,777,301 | 1/1957 | Kuhn | 62/178 |
| 3,101,926 | 8/1963 | Weber | 415/164 |
| 3,799,694 | 3/1974 | Duzan | 415/211 |
| 3,965,673 | 6/1976 | Friedrich | 60/39.15 |
| 4,091,613 | 5/1978 | Young | 60/39.07 |

Primary Examiner—Louis J. Casaregola
Attorney, Agent, or Firm—H. Fredrick Hamann; Harry B. Field

[57] ABSTRACT

An integrated auxiliary power unit and environmental control unit for an airplane 2, said integrated unit 2 comprising a prime mover 4, a variable geometry compressor 22 operable selectably by bleed air from the propulsion engine of said airplane or connectable via an overrunning clutch 18 to said prime mover, a controlled emission turbine 24 which is shaft-coupled to said compressor 22 and cooperating with said compressor to form an environmental control unit, and means for diverting a portion of the output of said compressor for use as an auxiliary power unit.

1 Claim, 3 Drawing Figures

INTEGRATED AUXILIARY POWER AND ENVIRONMENTAL CONTROL UNIT

CROSS-REFERENCE TO RELATED APPLICATION

This application is a continuation-in-part of copending application Ser. No. 155,369, filed June 2, 1980, and abandoned on Dec. 30, 1982.

BACKGROUND OF THE INVENTION

1. Field of the Invention

This invention relates to turbomachinery and is particularly directed to integrated auxiliary power and environmental control units for aircraft and the like.

2. Description of the Prior Art

In large aircraft, it has been the custom, heretofore, to provide an auxiliary power unit, comprising a prime mover driving a compressor, which served to provide compressed air for powering the airplane air cycle environmental control unit, or for powering the airplane engine air starters. In passenger planes, it has been customary to also provide an environmental control unit for cooling, heating and pressurization of the passenger compartment. This unit has comprised a turbine which may be driven either by bleed air from the airplane's propulsion engines or by compressed air provided by a separate prime mover (auxiliary power unit). The prime mover mechanically drives a compressor for providing additional air flow to the environmental control unit turbine, to provide both the proper aircraft ventilation rate and provide an energy source for the environmental control cycle. Air flow from the environmental control unit turbine is also provided to the aircraft cabin at the desired temperature and pressure. It has been conventional, heretofore, to drive the compressor of the environmental control unit at maximum output to provide a maximum flow rate for the limiting heating or cooling condition and adjust the output flow temperature by flow mixing through a temperature control valve. In large passenger planes, it has been customary to provide a plurality of independent environmental control units.

It will be apparent that, where a plurality of independent environmental control units are provided, it is also necessary to provide a corresponding plurality of sensor and control systems. It should also be noted that, with the systems of the prior art, it has been necessary to operate each of these environmental control unit compressors at maximum output at all times, regardless of the actual demand, in order to be able to accommodate a range of potential demands. Obviously, this is not energy efficient.

BRIEF SUMMARY OF THE INVENTION

These disadvantages of the prior art are overcome with the present invention. Means are provided for accomplishing the functions of an auxiliary power units plus a plurality of environmental control units, of the prior art, with substantially improved energy efficiency, reduced complexity, lower operating and maintenance costs and lighter, less expensive equipment.

The advantages of the present invention are preferably attained by providing an auxiliary power unit comprising a prime mover and a variable geometry compressor. These can be driven by bleed air from the plane's propulsion engines or can be connected through an overrunning clutch to be driven by said prime mover. The compressor is shaft-coupled to a controlled emission turbine which cooperates with said compressor to form an environmental control unit. When the compressor is directly driven by the prime mover, it can serve the needs of both the auxiliary power unit and the environmental control unit. Alternatively, when the plane is in flight, the compressor can be decoupled from the power unit by means of the overrunning clutch, and can be driven by bleed air from the plane's propulsion engines to serve the environmental control unit.

It will be seen that the single compressor of the present invention replaces two compressors in prior art equipment. This provides substantial reductions in weight and size, which can be translated into greater payback or reduced requirements for a given payload. In addition, the variable geometry compressor has variable exit vanes which can be adjusted to regulate flow to the turbine to substantially constant pressure, and thereby maintain near peak operating efficiencies. The turbine emission can be controlled by partitioning the flow supply to achieve flow matching with the compressor, to minimize pressure throttling to the turbine and, hence, to maintain near constant pressure over a wide flow operating range. This also permits a portion of the compressor discharge air to be diverted from the turbine for other purposes, such as driving an engine starter motor. In addition, this arrangement enables the environmental control unit to operate at constant speed, near peak design efficiency, throughout most of the operating range. Consequently, the system of the present invention is highly energy efficient.

OBJECTS OF THE INVENTION

It is an object of the present invention to provide a method and apparatus for accomplishing the functions of an auxiliary power unit and an environmental control unit in apparatus which is compact, light-weight, energy efficient and economical to install and maintain.

Another object of the present invention is to provide a combined auxiliary power unit and environmental control unit which operates at constant speed, near peak design efficiency, over a wide operating range.

A specific object of the present invention is to provide an integrated auxiliary power unit and environmental control unit for an airplane, said integrated unit comprising a prime mover, a variable diffuser compressor operable selectably by bleed air from the propulsion engine of said airplane or connectable via an overrunning clutch to said prime mover, a controlled emission turbine which is shaft coupled to said compressor and cooperating with said compressor to form an environmental control unit, and means for diverting a portion of the output of said compressor for use as an auxiliary power unit.

These and other objects and features of the present invention will be apparent from the following detailed description, taken with reference to the accompanying drawing.

DETAILED DESCRIPTION OF THE PREFERRED EMBODIMENT

Figure 1:
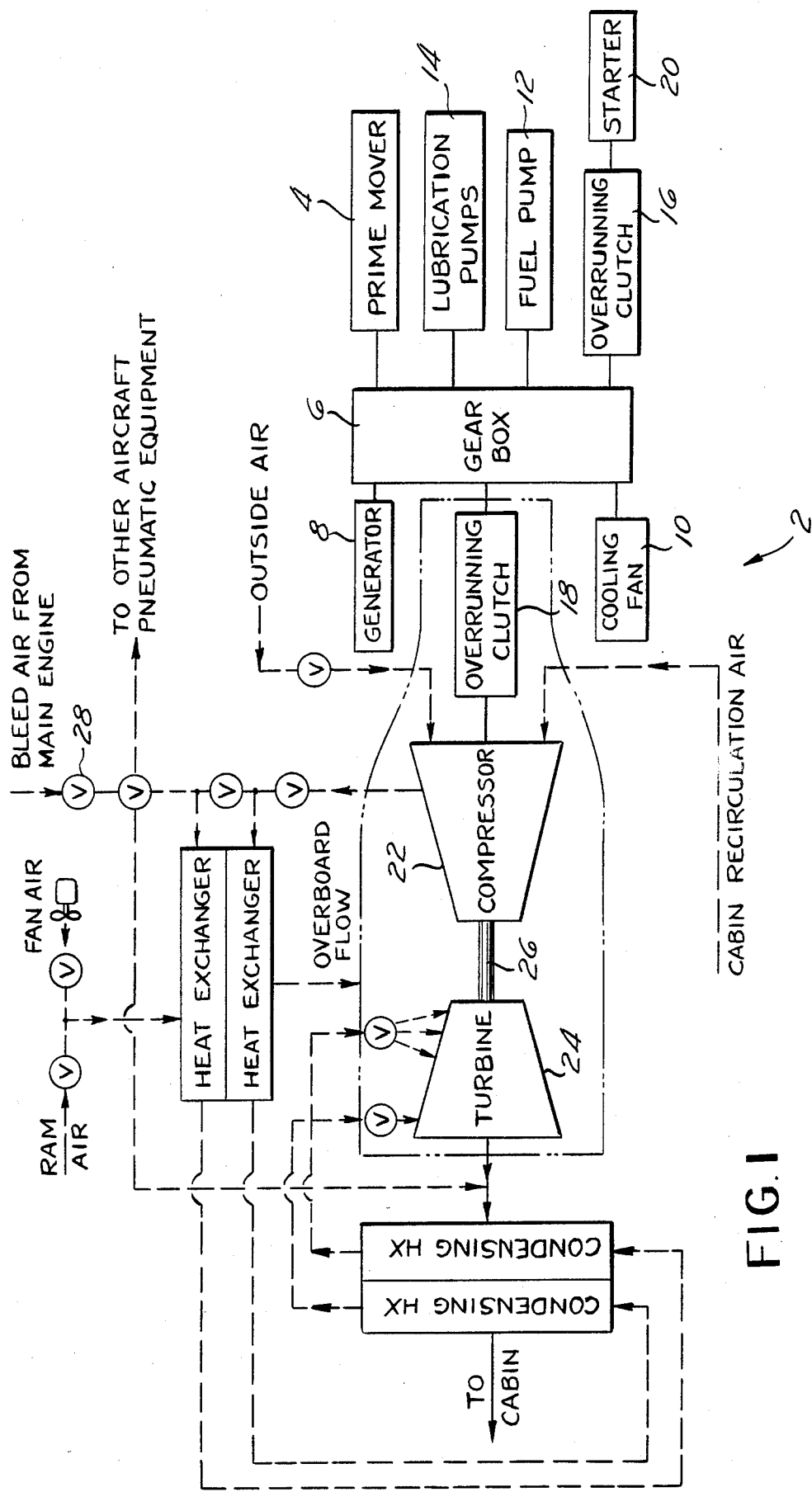
FIG. 1 is a diagrammatic representation of an integrated auxiliary power and environmental control unit embodying the present invention.

In that form of the present invention chosen for purposes of illustration, the Figures show an integrated auxiliary power unit and environmental control unit, indicated generally at 2, having a prime mover 4 which drives a gearbox 6 and through gearbox 6, drives a variety of equipment, such as generator 8, cooling fan 10, fuel pump 12, lubrication pump 14 and overrunning clutches 16 and 18. Clutch 16 is engageable for drive starter 20 to rotate prime mover 4 through gearbox 6, for starting prime mover 4. Clutch 18 is engageable to drive a variable geometry compressor 22 and a controlled emission turbine 24 which are mounted on a common drive shaft 26.

Figure 2:
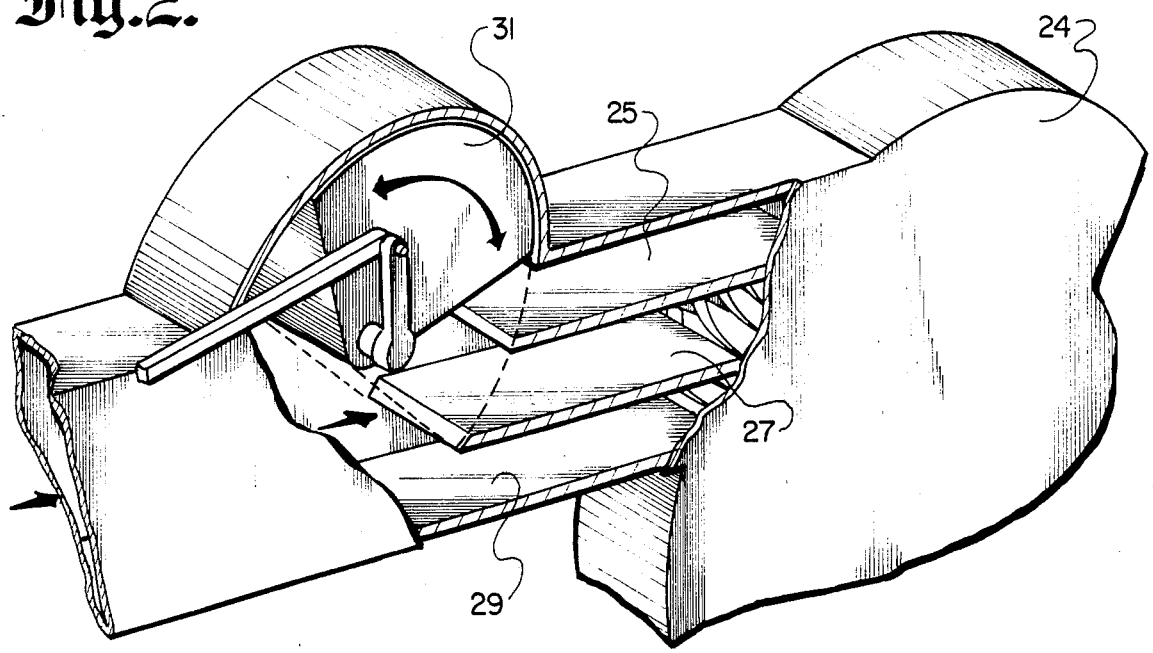
FIG. 2 depicts the partitioning means at the turbine input of the present invention.

The variable geometry compressor 22 includes a diffuser having variable exit vanes which are adjustable to control the flow area and pressure of air passing into or out of the compressor 22. This permits operation of the compressor 22 at nearly constant pressure and near peak efficiency with low energy utilization, with prime mover 4 providing minimal drive power or, if prime mover 4 is inactive, compressor 22 is driven by a minimal amount of engine bleed air, as seen at 28 in the figures. If desired, a variable set of compressor inlet guide vanes can also be added to further reduce the energy utilization of the environmental control unit. Such compressors are components of the Lycoming T55-L11 aircraft engine, manfactured by AVCO Lycoming Corporation, Stratford, Conn., and as components of engines developed by the National Aeronautics and Space Administration. The controlled emission turbine 24 uses controllable inlet ducting as depicted in FIG. 2 to partition the amount of air flow input to the turbine, while maintaining substantially constant pressure so as to assure operation of the turbine 24 at near peak efficiency. This permits adjustment of the emission from turbine 24 to match the flow from compressor 22 which minimizes pressure throttling to the turbine and permits maintenance of near constant pressure over a wide flow operating range. The compressor 22 and the flow partitioning turbine 24 are precalibrated such that the diffuser vane setting and the turbine inlet partition 31 setting each correspond to the same percentage of full (100%) flow. For example, the turbine inlet partition of FIG. 2 may be set to allow air flow through each of turbine inlet 25, 27 and 29 or 100% flow, it may be set to block inlet 25 to provide 75% flow or it may be set to block both inlets 25 and 27, providing 50% flow. In the preferred embodiment, inlet 29 is always open, assuring that the turbine has at least 50% of the possible inlet flow. The diffuser vane settings will be set to provide the appropriate output to match any of the three allowable turbine inlet settings.

The diffuser vanes and turbine inlet partition may be controlled by a number of conventional means such as electrical motors, hydraulic or pneumatic means or the like. In the preferred embodiment of the invention, the control means comprises electric motors coupled to a controller 30 which is programmed to respond to flow control logic as explained in detail hereinbelow. Table A is provided as an aid to understanding the logic.

TABLE A

| Temperature Conditions | dT/dt > 2°/10 Sec | dT/dt < 2°/10 Sec | |
|---|---|---|---|
| ↓ → | | dT/dt > 2°/min | dT/dt < 2°/min |
| Ts−Tc > 2° | 100% | 100% | 100% |
| Ts−Tc < 2° | 50% | 75% | Maintain Position Setting |

Signal to Compressor and Turbine

Figure 3:
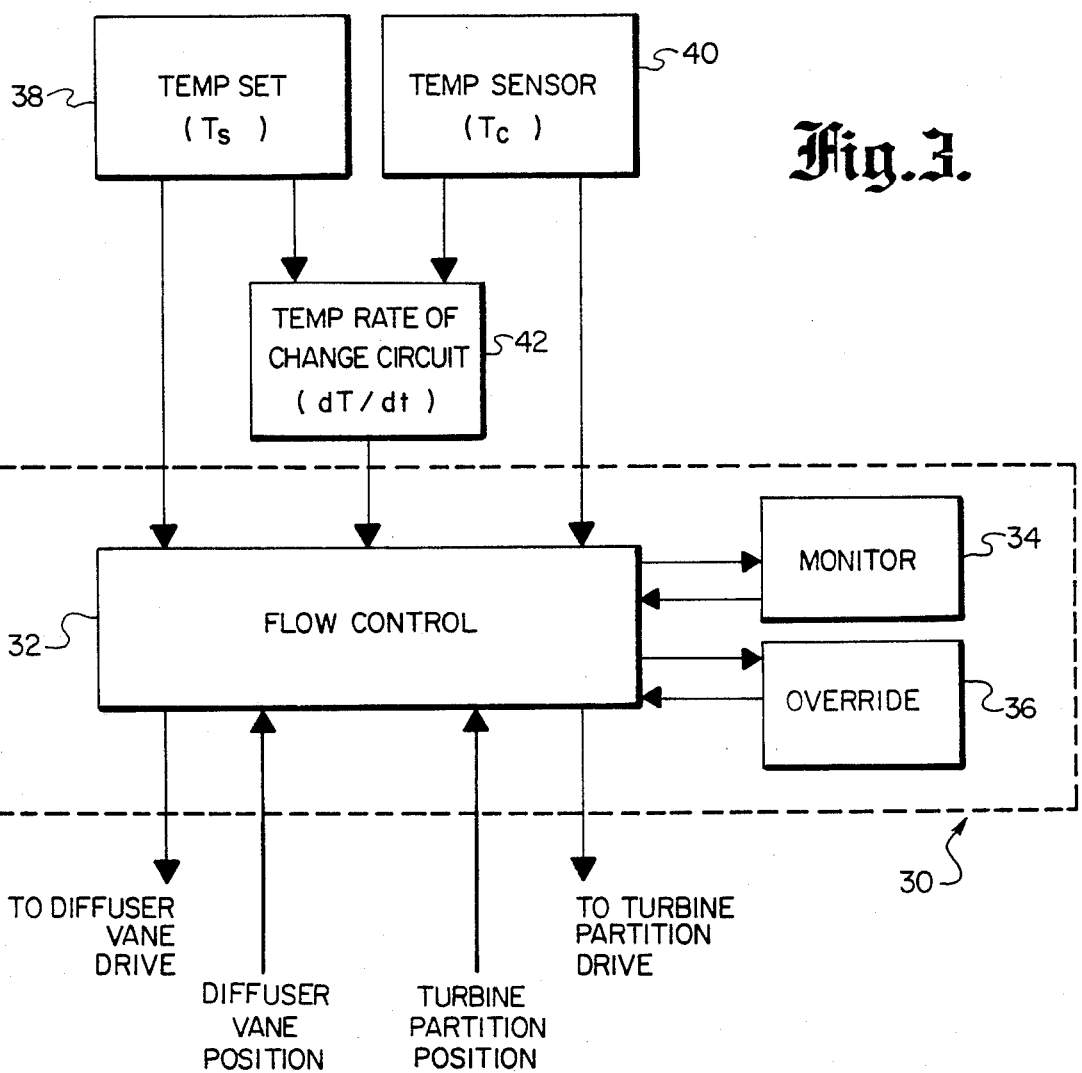
FIG. 3 is a block diagram of the control circuitry for the compressor output and turbine input flow regulators of the present invention.

As depicted in FIG. 3, controller 30 comprises flow control section 32, monitor section 34 and override section 36. Flow control section 32 receives input data from cabin temperature setting control (Ts) 38, cabin temperature sensor (Tc), and cabin temperature rate of change circuit (dT/dt) 42. Referring now to TABLE A, it is seen that if Ts−Tc is greater than 2° F., flow control section 32 will signal compressor 22 to provide and flow partitioned turbine 24 to accept, 100% flow. This corresponds to all of the turbine 24 inlets 25,27 and 29 of FIG. 2 being open. If Ts−Tc<2° F. and dT/dt>2° F./10 sec., flow control section 32 will signal the compressor 22 to provide and turbine 24 to accept 50% flow. If Ts−Tc<2° and dT/dt is less than 2° F./10 seconds but greater than 2° F./minute, flow control section 32 will signal the compressor 22 to provide and the turbine 24 to accept, 75% flow. Finally, if Ts−Tc<2° F. and dT/dt<2° F./min the flow control section 32 will maintain the compressor vane and partition setting previously set.

Monitor section 34 counts the number of flow change signals to compressor 22 and turbine 24. If controller 30 cycles between the same two flow positions more than once in a ten-minute period, monitor section 34 will set the flow rate to the higher of the two positions and hold the setting for 10 minutes before again allowing flow control secton 32 to determine if the flow should be changed. Additionally, override section 36 constantly compares the turbine inlet flow to the preprogrammed minimum cabin ventilation requirement. If flow control 32 requests a flow rate below the minimum requirement, it will be overridden by override section 34.

The integrated system of the present invention combines the energy saving features of an energy-efficient, recirculating, environmental control unit and an auxiliary power unit into a single integrated unit, which can be controlled to expend less energy than a separate environmental control unit and a separate auxiliary power unit, throughout the aircraft mission. Obviously, combining the environmental control unit and auxiliary power unit permits elimination of one compressor, with attendant savings in weight, space, installation and operating costs. Furthermore, shaft coupling of the compressor and turbine is about 98% efficient, while conventional air coupling is only about 80% efficient.

Numerous variations and modifications may be made without departing from the present invention. Accordingly, it should be clearly understood that the form of the present invention described above and shown in the accompanying drawings is illustrative only and is not intended to limit the scope of the present invention.

What is claimed and desired to be secured by Letters Patent of the United States:

1. An integrated environmental control and auxiliary power unit for a vehicle having a propulsion engine, said unit comprising:
   a prime mover;

a variable geometry compressor including a diffuser having a plurality of controllable variable exit vanes;

means for positioning said variable exit vanes to control the output flow of said compressor;

an overrunning clutch operable to couple said prime mover to drive said compressor;

means for supplying bleed air from said propulsion engine to drive said compressor when said prime mover is not running;

a controlled emission turbine coupled to said compressor by a common drive shaft;

means for blocking a selectable portion of the flow supplied to said turbine to match the flow from said compressor to maintain near constant pressure to said turbine over a wide flow operating range; and means for independently utilizing the output flow from said compressor and from said turbine.

* * * * *